United States Patent
Kajiwara

(10) Patent No.: US 9,985,423 B2
(45) Date of Patent: May 29, 2018

(54) WIRE HARNESS AND METHOD FOR PRODUCING WIRE HARNESS

(75) Inventor: Yasuhiro Kajiwara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 269 days.

(21) Appl. No.: 14/238,034

(22) PCT Filed: Apr. 16, 2012

(86) PCT No.: PCT/JP2012/060249
§ 371 (c)(1),
(2), (4) Date: Feb. 10, 2014

(87) PCT Pub. No.: WO2013/057972
PCT Pub. Date: Apr. 25, 2013

(65) Prior Publication Data
US 2014/0190742 A1    Jul. 10, 2014

(30) Foreign Application Priority Data

Oct. 20, 2011  (JP) ................. 2011-230442

(51) Int. Cl.
*H02G 3/04*    (2006.01)
*B29C 43/30*   (2006.01)
*H01B 13/012*  (2006.01)

(52) U.S. Cl.
CPC ......... *H02G 3/0406* (2013.01); *B29C 43/305* (2013.01); *H02G 3/0481* (2013.01); *H01B 13/01263* (2013.01)

(58) Field of Classification Search
CPC .. H02G 3/0481; H02G 3/0406; B29C 43/305; H01B 13/01263
USPC ............................ 174/72 A, 68.1, 68.3, 72 C
See application file for complete search history.

(56) References Cited

U.S. PATENT DOCUMENTS

| | | | |
|---|---|---|---|
| 7,037,866 B2 * | 5/2006 | Michaud | 442/408 |
| 2002/0098311 A1* | 7/2002 | Lindner | 428/40.1 |
| 2004/0222804 A1* | 11/2004 | Inuzuka et al. | 324/690 |
| 2005/0126547 A1* | 6/2005 | Kato et al. | 123/518 |
| 2007/0278034 A1* | 12/2007 | Yamaura et al. | 181/229 |

FOREIGN PATENT DOCUMENTS

| | | |
|---|---|---|
| JP | 08-331728 | 12/1996 |
| JP | 2011-160611 | 8/2011 |
| JP | 2011-171098 | 9/2011 |

(Continued)

*Primary Examiner* — Jinhee Lee
*Assistant Examiner* — Rockshana Chowdhury
(74) *Attorney, Agent, or Firm* — Greenblum & Bernstein, P.L.C.

(57) ABSTRACT

An objective is to achieve a configuration for mounting a wire harness in a vehicle to protect the wire harness and regulate a path in a simpler manner with fewer components. A wire harness has a wire harness main body including at least one wire, and a protection member protecting the wire harness main body. The protection member includes an inner peripheral protection portion formed by hot-pressing a nonwoven member in a state of covering at least a portion of the wire harness main body and an outer peripheral protection portion formed by hot-pressing a nonwoven member in a state of covering at least a portion of the inner peripheral protection portion in an extending direction.

4 Claims, 9 Drawing Sheets

(56) References Cited

FOREIGN PATENT DOCUMENTS

| WO | 2011/096103 | 8/2011 | | |
|----|----|----|----|----|
| WO | 2011/102013 | 8/2011 | | |
| WO | WO 2011102013 A1 * | 8/2011 | ........... | H02G 3/0481 |
| WO | 2011/158393 | 12/2011 | | |
| WO | WO 2011158393 A1 * | 12/2011 | ........... | H02G 3/0481 |

* cited by examiner

WIRE HARNESS AND METHOD FOR PRODUCING WIRE HARNESS

TECHNICAL FIELD

The present invention relates to a technology to protect a wire harness.

BACKGROUND ART

In a conventionally proposed technology, as disclosed in Patent Literature 1, a nonwoven fabric is hot-pressed in a state of covering a wire bundle covered to form a wire protection member for protection and path regulation.

CITATION LIST

Patent Literature

Patent Literature 1: Japanese Patent Laid-Open Publication No. 2011-160611

SUMMARY OF INVENTION

Technical Problem

Conventionally, however, a separate fixating component, such as a clip component or the like, is required to be attached in order to fixate a wire harness having a wire bundle covered by a protection member to a vehicle.

In view of the above, the present invention is intended to achieve a configuration for mounting a wire harness in a vehicle to protect the wire harness and regulate a path in a simpler manner with fewer components.

Solution to Problem

To address the circumstances above, a first aspect provides a wire harness having a wire harness main body including at least one wire, and a protection member including an inner peripheral protection portion formed by hot-pressing a nonwoven member in a state of covering at least a portion of the wire harness main body and an outer peripheral protection portion formed by hot-pressing a nonwoven member in a state of covering at least a portion of the inner peripheral protection portion in an extending direction.

A second aspect provides the wire harness according to the first aspect, in which the outer peripheral protection portion is softer than the inner peripheral protection portion.

A third aspect provides the wire harness according to the first or second aspect, in which the outer peripheral protection portion is larger in size than a gap serving as a mounting location in a range press-fittable thereto.

A fourth aspect provides the wire harness according to one of first to third aspects, in which the outer peripheral protection portion has a circular shape in cross section.

A fifth aspect provides the wire harness according to one of first to fourth aspects, in which the outer peripheral protection portions are provided in a plurality of locations with a distance therebetween along the extending direction of the inner peripheral protection portion.

Furthermore, to address the circumstances above, a sixth aspect provides a method of producing a wire harness having a protection member covering at least a portion of a wire harness main body including at least one wire. The method includes (a) a process of wrapping a first nonwoven member around at least a portion of the wire harness main body; (b) a process of hot-pressing the first nonwoven member to form an inner peripheral protection portion; (c) a process of wrapping a second nonwoven member around a portion of the inner peripheral protection portion in an extending direction; and (d) a process of hot-pressing the second nonwoven member to form an outer peripheral protection portion.

Advantageous Effects of Invention

According to the first aspect, the inner peripheral protection portion can protect the wire harness and regulate a path. Furthermore, the wire harness can be mounted in a vehicle by press-fitting the outer peripheral protection portion to the gap, which is a mounting location in the vehicle. This achieves a simpler configuration for mounting the wire harness in the vehicle to protect the wire harness and regulate the path. In addition, the hot-pressed inner peripheral protection portion is covered by the outer peripheral protection portion. Thus, the inner peripheral protection portion can be hardened sufficiently by hot-pressing, and protection performance and path regulating performance can be improved.

According to the second aspect, the outer peripheral protection portion is softer than the inner peripheral protection portion. This allows the outer peripheral protection portion to be readily press-fitted to the gap, which is the mounting location in the vehicle, to mount the wire harness in the vehicle.

According to the third aspect, the outer peripheral protection portion can be press-fitted to the gap with no instability.

According to the fourth aspect, the outer peripheral protection portion has the circular shape in cross section. This allows the outer peripheral protection portion to be readily press-fitted to the gap.

According to the fifth aspect, the plurality of outer peripheral protection portions can be press-fitted to the gaps, thus securing mounting of the wire harness and preventing the inner peripheral protection portion from interfering with the vehicle between the plurality of outer peripheral protection portions.

According to the method of producing the wire harness of the sixth aspect, the outer peripheral protection portion can be readily formed around the inner peripheral protection portion formed by hot-pressing the nonwoven member. Then, the inner peripheral protection portion can protect the wire harness and regulate a path. Furthermore, the wire harness can be mounted in a vehicle by press-fitting the outer peripheral protection portion to the gap, which is a mounting location in the vehicle. This achieves a simpler configuration for mounting the wire harness in the vehicle to protect the wire harness and regulate the path. In addition, the hot-pressed inner peripheral protection portion is covered by the outer peripheral protection portion. Thus, the inner peripheral protection portion can be hardened sufficiently by hot-pressing, and protection performance and path regulating performance can be improved.

DESCRIPTION OF EMBODIMENTS

A wire harness 10 according to an embodiment and a method of producing the same are described below.

Figure 1:
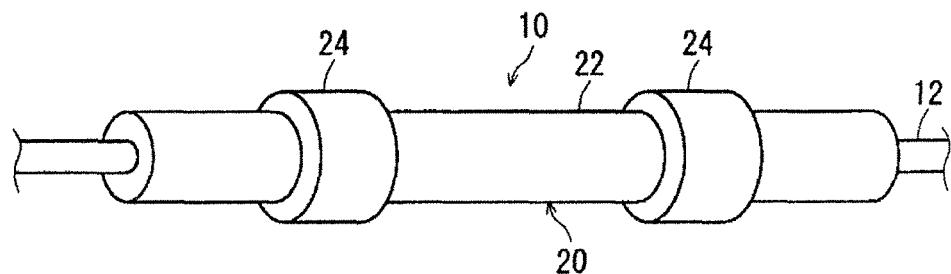
FIG. 1 A schematic perspective view of a wire harness according to an embodiment.
Figure 2:
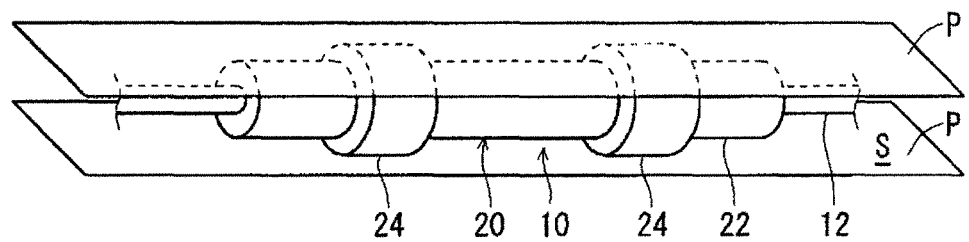
FIG. 2 A view illustrating a state in which the wire harness according to the embodiment is provided in a vehicle.
Figure 3:
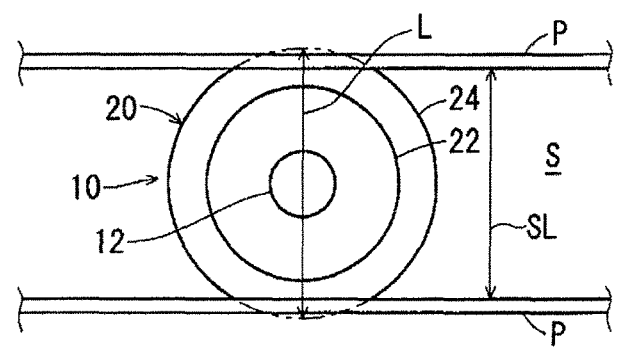
FIG. 3 A view illustrating a state in which the wire harness according to the embodiment is provided in a vehicle.

The wire harness 10 is described first. FIG. 1 is a schematic perspective view of the wire harness 10; FIGS. 2 and 3 are each a view illustrating a state where the wire harness 10 is provided in a vehicle.

The wire harness 10 has a wire harness main body 12 and a protection member 20.

The wire harness main body 12 includes at least one wire. In the present embodiment, the wire harness main body 12 is configured by bundling a plurality of wires. The electric wires are a wiring material that electrically connects various electric devices in a vehicle and the like. The wire harness main body 12 may include an optical cable and the like.

The protection member 20 has an inner peripheral protection portion 22 and an outer peripheral protection portion 24. Both the inner peripheral protection portion 22 and the outer peripheral protection portion 24 are formed by hot-pressing a nonwoven member.

The nonwoven member is a material that can be hardened in a heating process. Such a nonwoven member can contain an elementary fiber and an adhesive resin (also referred to as a binder) intertwined therewith. The adhesive resin has a lower melting point (for example, 110° C. to 115° C.) than that of the elementary fiber. The nonwoven member is heated at a processing temperature lower than the melting point of the elementary fiber and higher than the melting point of the adhesive resin, and then the adhesive resin melts and seeps in between the elementary fibers. Thereafter, the temperature of the nonwoven member lowers below the melting point of the adhesive resin, and then the adhesive resin is solidified in a state where the elementary fibers are bound together. Thus, the nonwoven member becomes harder than in a pre-heating state and is maintained in a shape formed at the time of heating. The melted adhesive resin also seeps into a contact portion between the nonwoven members and is solidified, thus binding the contact portion between the nonwoven members.

Any fiber capable of maintaining a fibrous state at the melting point of the adhesive resin can be used as the elementary fiber. Other than a resin fiber, various fibers, including a glass fiber, can be used. Furthermore, a thermoplastic resin fiber, which has a melting point lower than the elementary fiber, can be used as the adhesive resin. The adhesive resin may be granular or fibrous. Alternatively, a binder fiber may be provided by forming an adhesive resin layer around an outer periphery of a core fiber and be intertwined with the elementary fiber. The core fiber in this case can be the same material as the elementary fiber.

An exemplary combination of the elementary fiber and the adhesive resin may include a resin fiber composed of PET (polyethylene terephthalate) as the elementary fiber and a copolymer resin composed of PET and PEI (polyethylene isophthalate) as the adhesive resin. In this case, the melting point of the elementary fiber is approximately 250° C., while the melting point of the adhesive resin is 110° C. to 150° C. Thus, when the nonwoven member is heated at a temperature of 110° C. to 250° C., the adhesive resin melts and seeps in between the elementary fibers, which do not melt and hold a fibrous shape. Thereafter, the temperature of the nonwoven member lowers below the melting point of the adhesive resin, and then the adhesive resin is solidified in a state where the elementary fibers are bound together, thus maintaining the shape formed above and binding the nonwoven members.

Hot-pressing refers to a process in which the nonwoven member is heated and pressed against a mold to be formed into a predetermined shape. Heating and forming into a predetermined shape may be performed simultaneously, and alternatively may be performed separately in sequence. For instance, after being heated in a compressed state, the nonwoven member is pressed against a predetermined mold to bend before being solidified by cooling, and thus is maintained in a bent shape. An example of hot-pressing suitable for the nonwoven member 20 according to the present embodiment will be described later in further detail.

The inner peripheral protection portion 22 is formed by hot-pressing the nonwoven member in a state of covering at least a portion of the wire harness main body 12. The inner peripheral protection portion 22 may cover substantially an entirety of the wire harness main body 12 in a longitudinal direction, or a portion of the wire harness main body 12.

An entire outer peripheral surface of the inner peripheral protection portion 22 is compressed and hardened sufficiently by hot-pressing so as to have a level of hardness to protect the wire harness main body 12 and a level of shape sustainability to retain a path of the wire harness main body 12. The inner peripheral protection portion 22 is formed into a shape (may be linear or curved) fitting a wiring path of the wire harness main body 12 in a vehicle or the like. Thus, the wire harness main body 12 is regulated to the shape. In the present embodiment, the inner peripheral protection portion 22 has a circular shape in cross section, but may have an elliptical or polygonal shape in cross section, or the like. Furthermore, a portion of the inner peripheral protection portion 22 does not need to be hot-pressed, but at least a portion covered by the outer peripheral protection portion 24 is hot-pressed.

The outer peripheral protection portion 24 is formed by hot-pressing the nonwoven member in a state of covering at least a portion of the inner peripheral protection portion 22 in an extending direction. In the present embodiment, the outer peripheral protection portions 24 are provided in a plurality of (two herein) locations with a distance therebetween. Of course, only one outer peripheral protection portion 24 may be provided.

In the present embodiment, the outer peripheral protection portion 24 has a circular shape in cross section. In other words, the outer peripheral protection portion 24 has an annular projecting shape projecting at an identical height along a circumferential direction of the inner peripheral protection portion 22. Of course, the outer peripheral protection portion 24 may have a shape other than circular in cross section, such as, for example, an elliptical or polygonal shape in cross section, or the like.

The outer peripheral protection portion 24 is larger in size than the gap S in a range press-fittable into the gap S, which is a mounting location (refer to FIGS. 2 and 3). More specifically, when the wire harness 10 is provided in the gap S between a pair of panels P, an outer diameter L of the outer peripheral protection portion 24 is larger than a distance SL of the gap S between the panels P. This allows the outer peripheral protection portion 24 to be press-fitted to the gap S with no instability. How much larger the outer diameter L of the outer peripheral protection portion 24 relative to the distance SL of the gap S also depends on flexibility of the outer peripheral protection portion 24. When the outer peripheral protection portion 24 is sufficiently soft, the outer diameter L of the outer peripheral protection portion 24 can be defined sufficiently larger than the distance SL of the gap S. Meanwhile, when the outer peripheral protection portion 24 is relatively hard, the outer diameter L of the outer peripheral protection portion 24 is preferably defined slightly larger than the distance SL of the gap S.

In any case, the outer peripheral protection portion 24 is preferably formed softer than the inner peripheral protection portion 22. More specifically, in consideration of the difference between the outer diameter L of the outer peripheral protection portion 24 and the gap S, the outer peripheral protection portion 24 is preferably formed soft sufficient to be held with no instability after being press-fitted to the gap S. Of course, the outer peripheral protection portion 24 may have hardness similar to the inner peripheral protection portion 22.

A specific example of separately forming into the inner peripheral protection portion 22 and the outer peripheral protection portion 24 will be described later together with an exemplary method of production.

According to the wire harness 10 configured as above, the inner peripheral protection portion 22 can protect the wire harness 10 and regulate a path. Furthermore, the outer peripheral protection portion 24 is press-fitted to the gap S, which is the mounting location in the vehicle, and thus the wire harness 10 can be mounted in the vehicle. This achieves a simpler configuration for mounting the wire harness 10 in the vehicle to protect the wire harness 10 and regulate the path. In addition, the hot-pressed inner peripheral protection portion 22 is covered by the outer peripheral protection portion 24. Thus, the inner peripheral protection portion 22 can be hardened sufficiently by hot-pressing, and even a portion where the outer peripheral protection portion 24 is provided has good protection performance and path regulating performance.

The inner peripheral protection portion 22 can be provided away from the panel P in a state where the outer peripheral protection portion 24 is press-fitted to the gap S and the wire harness 10 is mounted in the vehicle. This prevents generation of noise (slapping sound) and wear due to interference between the inner peripheral protection portion 22 and the panel P.

Furthermore, the outer peripheral protection portion 24 itself can be formed into a shape press-fittable to the gap S (circular shape in cross section in the embodiment above), thus simplifying the shape.

The outer peripheral protection portion 24 is softer than the inner peripheral protection portion 22. This allows the outer peripheral protection portion 24 to be readily press-fitted to the gap S to mount the wire harness 10 in the vehicle.

Since the outer peripheral protection portion 24 has a circular shape in cross section, the direction does not need to be strictly controlled when the outer peripheral protection portion 24 is press-fitted to the gap S, thus facilitating press-fitting.

In addition, the outer peripheral protection portions 24 are provided in a plurality of locations (two herein) with a distance therebetween. This allows the wire harness 10 to be securely mounted so as to be less unstable. Furthermore, this prevents the inner peripheral protection portion 22 from interfering with the vehicle between the plurality of outer peripheral protection portions 24.

A method of producing the protection member 20 is described.

Figure 4:
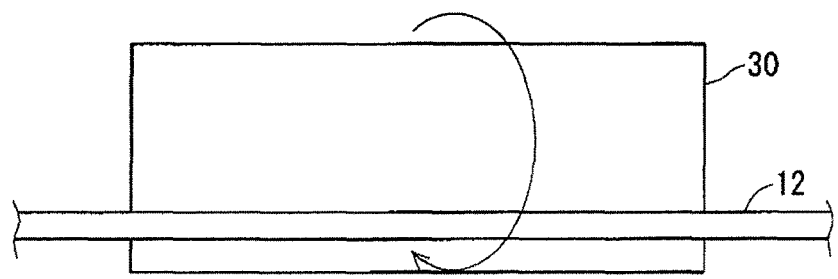
FIG. 4 A view illustrating a process of producing a wire harness.
Figure 5:
FIG. 5 A view illustrating a process of producing the wire harness.

With reference to FIGS. 4 and 5, a first nonwoven member 30 is first wrapped around at least a portion of the wire harness main body 12. In the present embodiment, a square-sheet shaped nonwoven fabric, which serves as the first nonwoven member 30, is wrapped around the wire harness main body 12 at least one time. Alternatively, a strip-shaped nonwoven fabric may be used as the first nonwoven member 30 and be spirally wound around the wire harness main body 12.

Figure 6:
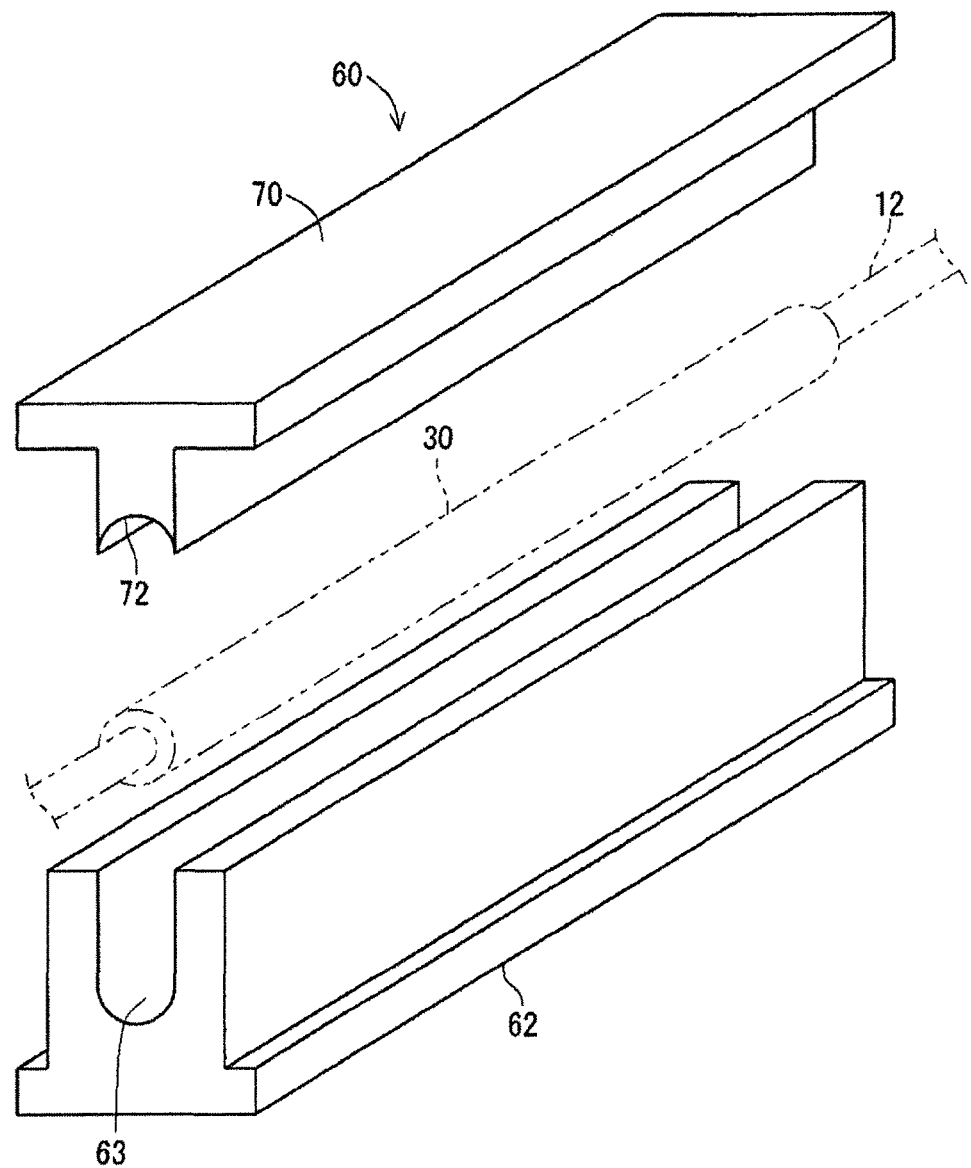
FIG. 6 A view illustrating a process of producing the wire harness.
Figure 7:
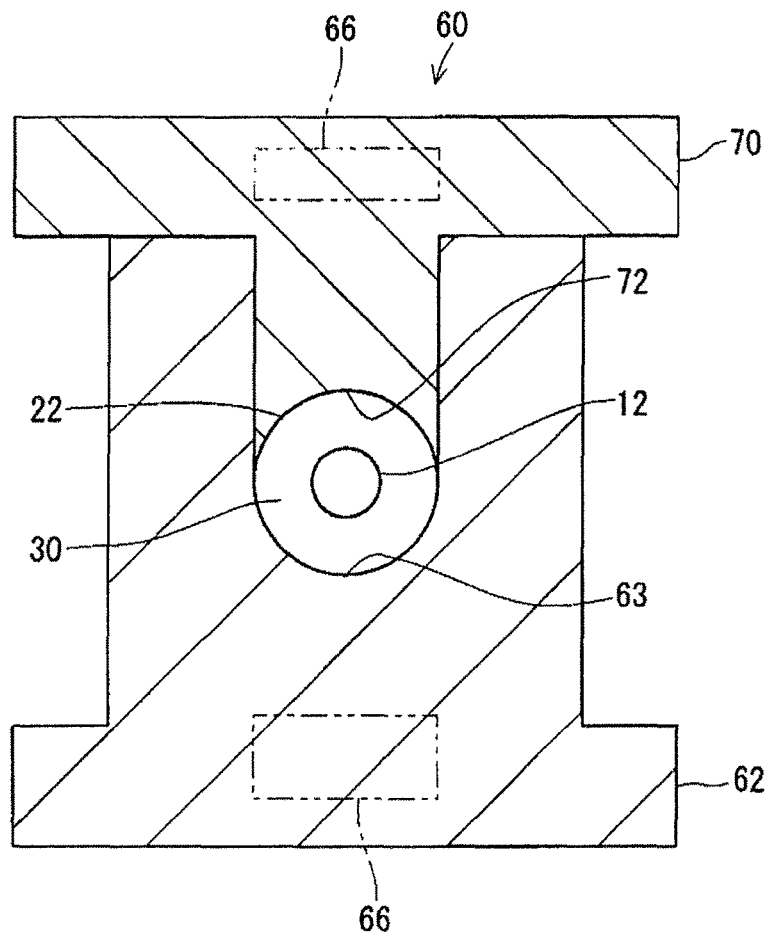
FIG. 7 A view illustrating a process of producing the wire harness.

Then, the first nonwoven member 30 is hot-pressed to form the inner peripheral protection portion 22. An exemplary configuration of a hot-pressing mold is described. FIG. 6 illustrates a hot-pressing mold 60. FIG. 7 is a schematic cross-sectional view of the hot-pressing mold 60 during hot-pressing.

The hot-pressing mold 60 has a lower mold 62 and an upper mold 70.

The lower mold 62, which is an elongated member formed of metal or the like having excellent thermal conductivity, has a lower mold surface 63 on one main surface (upper surface) thereof. The lower mold surface 63 has substantially a groove shape having a semi-tubular surface in a bottom portion and open upward. A length in a longitudinal direction of the lower mold surface 63 is substantially the same as a length of a protected portion of the wire harness main body 12 (portion to be covered by the protection member 20). Furthermore, the lower mold surface 63 has a shape extending along a path in which the protected portion of the wire harness main body 12 is mounted in a vehicle body (linear shape in FIG. 6; may be curved).

The upper mold 70, which is an elongated member formed of metal or the like having excellent thermal conductivity, has an upper mold surface 72 on one main surface (lower surface) thereof. The upper mold surface 72 has a groove shape having a semi-tubular surface in an upper portion and open downward. The upper mold surface 72 has a width capable of closing the upper opening of the lower mold surface 63 and being placed in the lower mold surface 63. The upper mold surface 72 has a shape extending along a path according to a bending shape of the lower mold surface 63.

The upper mold surface 72 is placed in the lower mold surface 63, and then a space is defined between the upper mold surface 72 and the lower mold surface 63 to enable the inner peripheral protection member 22 to be formed. A heating portion 66, such as a heater or the like, is provided to the lower mold 62 and upper mold 70.

Then, the portion of the wire harness main body 12 where the first nonwoven member 30 is wrapped is pressed into the lower mold surface 63.

Thereafter, the upper mold surface 72 of the upper mold 70 is inserted into the lower mold surface 63. In this state, the lower mold 63 and the upper mold 70 are heated and hot-pressing is performed. Then, the first nonwoven member 30 is heated in a compressed state between the lower mold surface 63 and the upper mold surface 72.

Thereafter, the first nonwoven member 30 is cooled, and then a surface of the first nonwoven member 30 is hardened in a shape according to the shape of the lower mold surface 63 and the upper mold surface 72. Thus, the inner peripheral protection portion 22 is formed. Before the first nonwoven member 30 is cooled and hardened, the next process may be performed.

Figure 8:
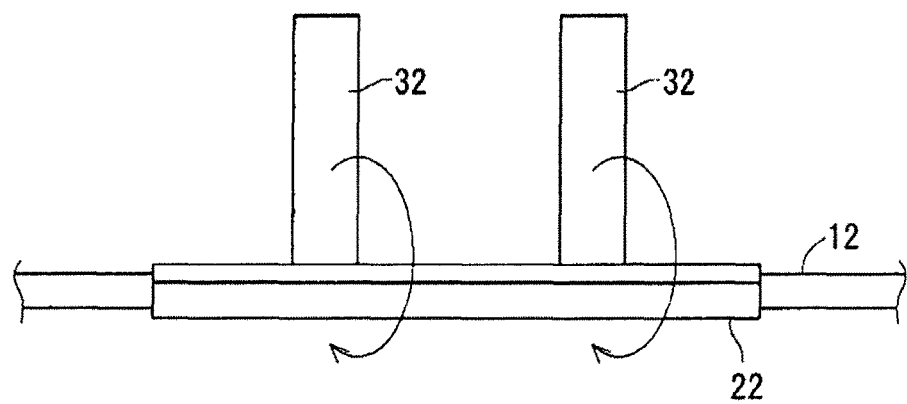
FIG. 8 A view illustrating a process of producing the wire harness.
Figure 9:
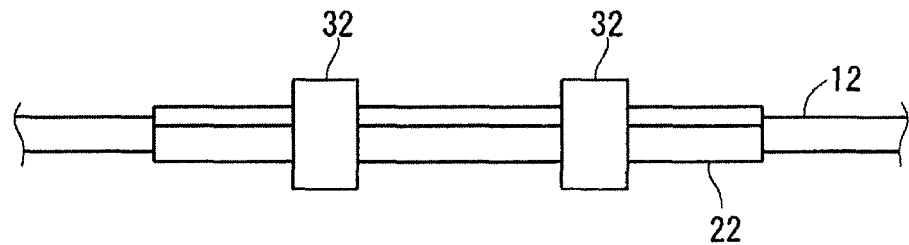
FIG. 9 A view illustrating a process of producing the wire harness.

Then, with reference to FIGS. 8 and 9, a second nonwoven member 32 is wrapped around a portion in the extending direction of the inner peripheral protection portion 22, specifically, a portion corresponding to the outer peripheral protection portion 24.

In the present embodiment, a strip-shaped nonwoven fabric is wrapped around as the second nonwoven member 32. A width of the strip-shaped nonwoven fabric serving as the second nonwoven member 32 is the same as or less than a width of the outer peripheral protection portion 24 to be formed. When the width of the strip-shaped nonwoven fabric serving as the second nonwoven member 32 is less than the width of the outer peripheral protection portion 24 to be formed, the second nonwoven member 32 can be spirally wound.

In the present embodiment, to provide the plurality of outer peripheral protection portions 24 as described above, the second nonwoven member 32 is wrapped around in a plurality of locations (two locations) with a distance therebetween on the outer periphery of the inner peripheral protection portion 22.

Then, the second nonwoven member 32 is hot-pressed to form the outer peripheral protection portion 24.

Figure 10:
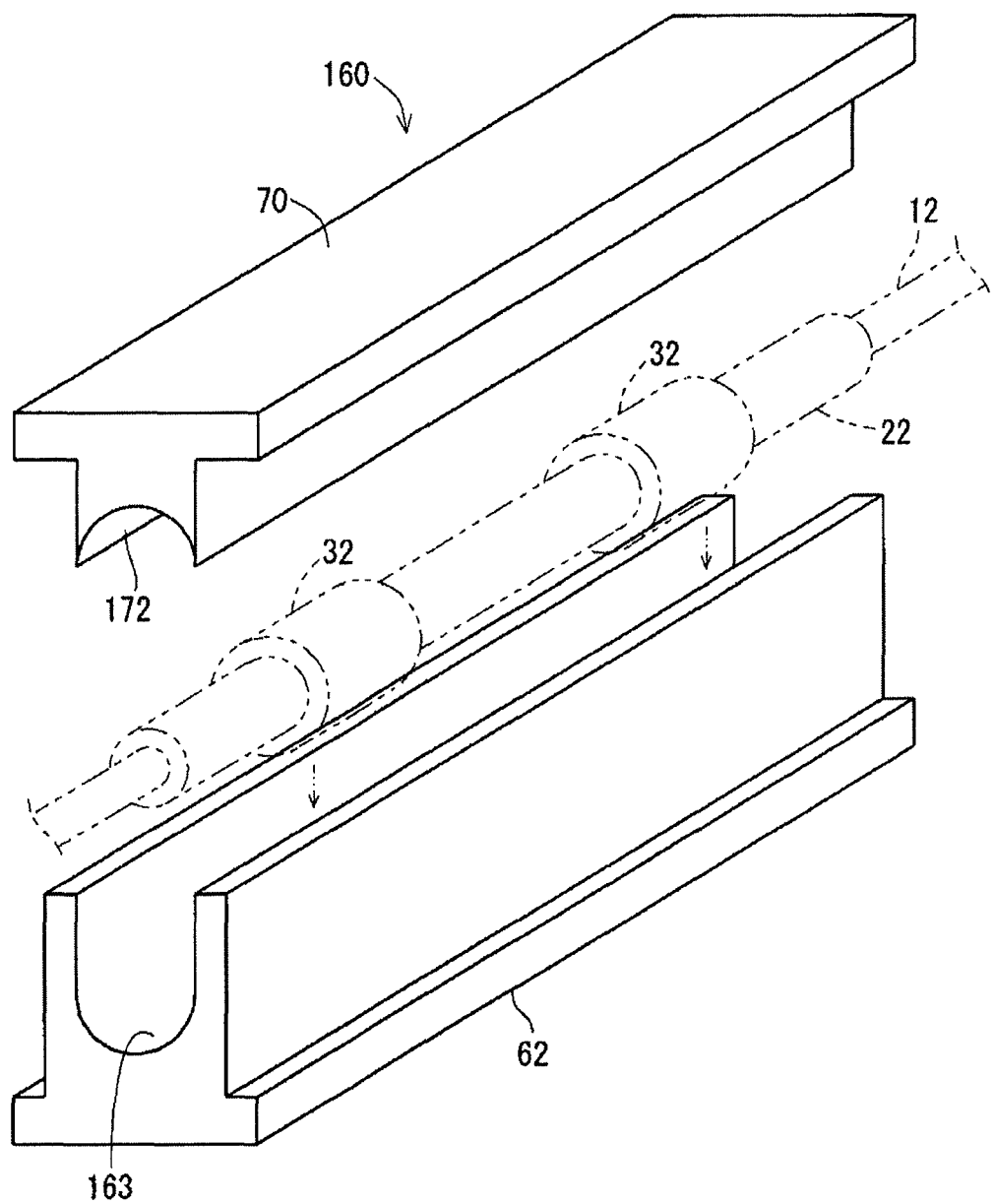
FIG. 10 A view illustrating a process of producing the wire harness.
Figure 11:
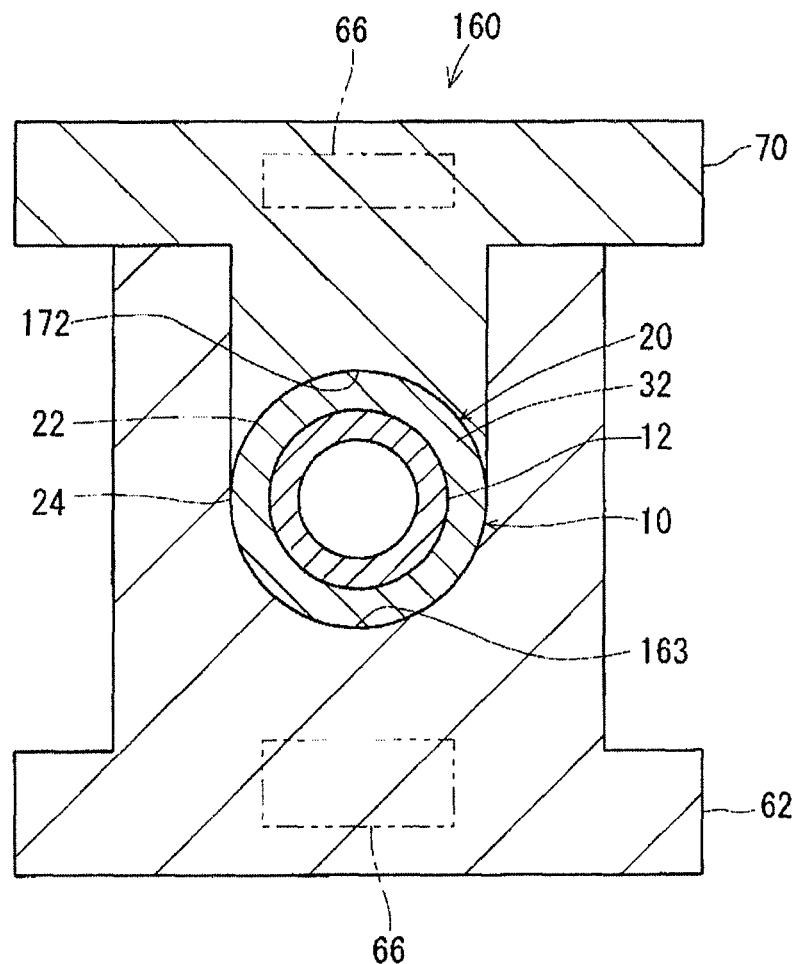
FIG. 11 A view illustrating a process of producing the wire harness.

With reference to FIGS. 10 and 11, a hot-pressing mold 160 herein can have a configuration similar to that of the hot-pressing mold 60, except that a lower mold surface 163, which corresponds to the lower mold surface 63, and an upper mold surface 172, which corresponds to the upper mold surface 72, are different in size. Specifically, the lower mold surface 163 and the upper mold surface 172 of this hot-pressing mold 160 are larger than the lower mold surface 63 and the upper mold surface 72. A space is defined between the lower mold surface 163 and the upper mold surface 172, the space being larger than the inner peripheral protection portion 22 and being capable of compressing the wrapped second nonwoven member 32, specifically, the space being capable of forming the outer peripheral protection portion 24. In FIGS. 10 and 11, configuration components similar to those of the hot-pressing mold 60 are denoted by the same reference numerals.

The hot-pressing mold 160, which is essentially for forming the outer peripheral protection portion 24, may be formed into a size capable of hot-pressing only the portion where the outer peripheral protection portion 24 is provided, or may be configured to be capable of heating only the outer peripheral protection portion 24.

The portion of the wire harness main body 12 where the second nonwoven member 32 is wrapped around is pressed into the lower mold surface 163.

Thereafter, the upper mold surface 172 is inserted into the lower mold surface 163. In this state, the lower mold 62 and the upper mold 70 are heated and hot-pressing is performed. Then, the second nonwoven member 32 is heated in a compressed state between the lower mold surface 163 and the upper mold surface 172.

Thereafter, the second nonwoven member 32 is cooled, and then a surface of the second nonwoven member 32 is hardened in a shape according to the shape of the lower mold surface 163 and the upper mold surface 172. Thus, the outer peripheral protection portion 24 is formed.

According to this method of production, the outer peripheral protection portion 24 can be readily formed around the inner peripheral protection portion 22, which is formed by hot-pressing the first nonwoven member 30.

Figure 12:
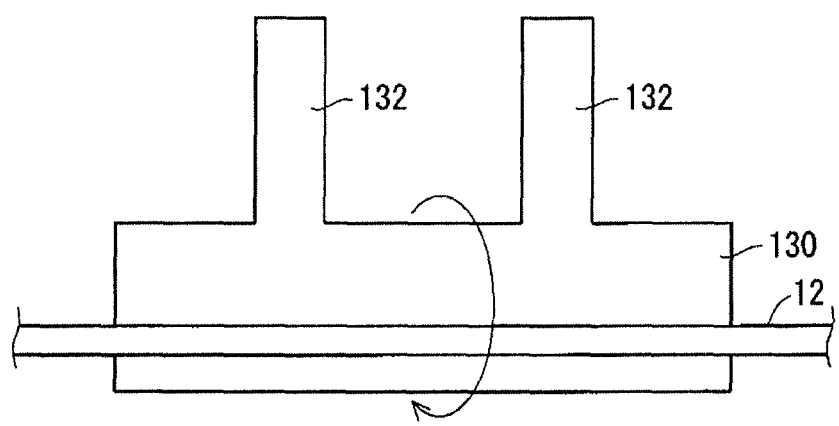
FIG. 12 A view illustrating a process of producing the wire harness according to a modified example.

In the example of the embodiment above, the first nonwoven member 30 and the second nonwoven member 32 are separate. As in a modified example shown in FIG. 12, however, a combined form may be employed in which a second nonwoven member 132, which corresponds to the second nonwoven member 32, extends from a first side edge portion of a first nonwoven member 130, which corresponds to the first nonwoven member 30. In the modified example, the second nonwoven members 132 extend from two end portions of the first side edge portion of the first nonwoven member 130 with a distance therebetween.

Figure 13:
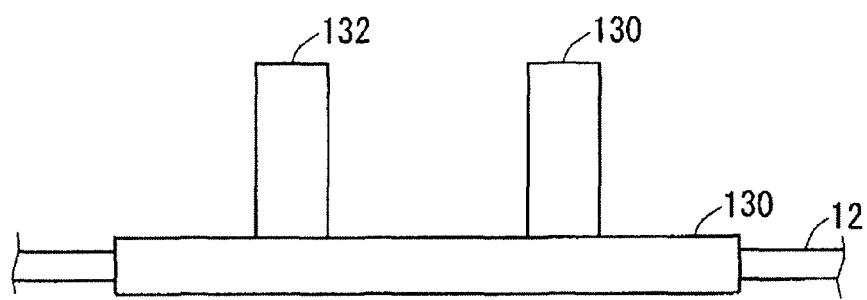
FIG. 13 A view illustrating a process of producing the wire harness according to the modified example.

Then, the wire harness main body 12 is placed along a second side edge portion of the first nonwoven member 130, and, as shown in FIG. 13, the first nonwoven member 130 is wrapped around the wire harness main body 12.

Figure 15:
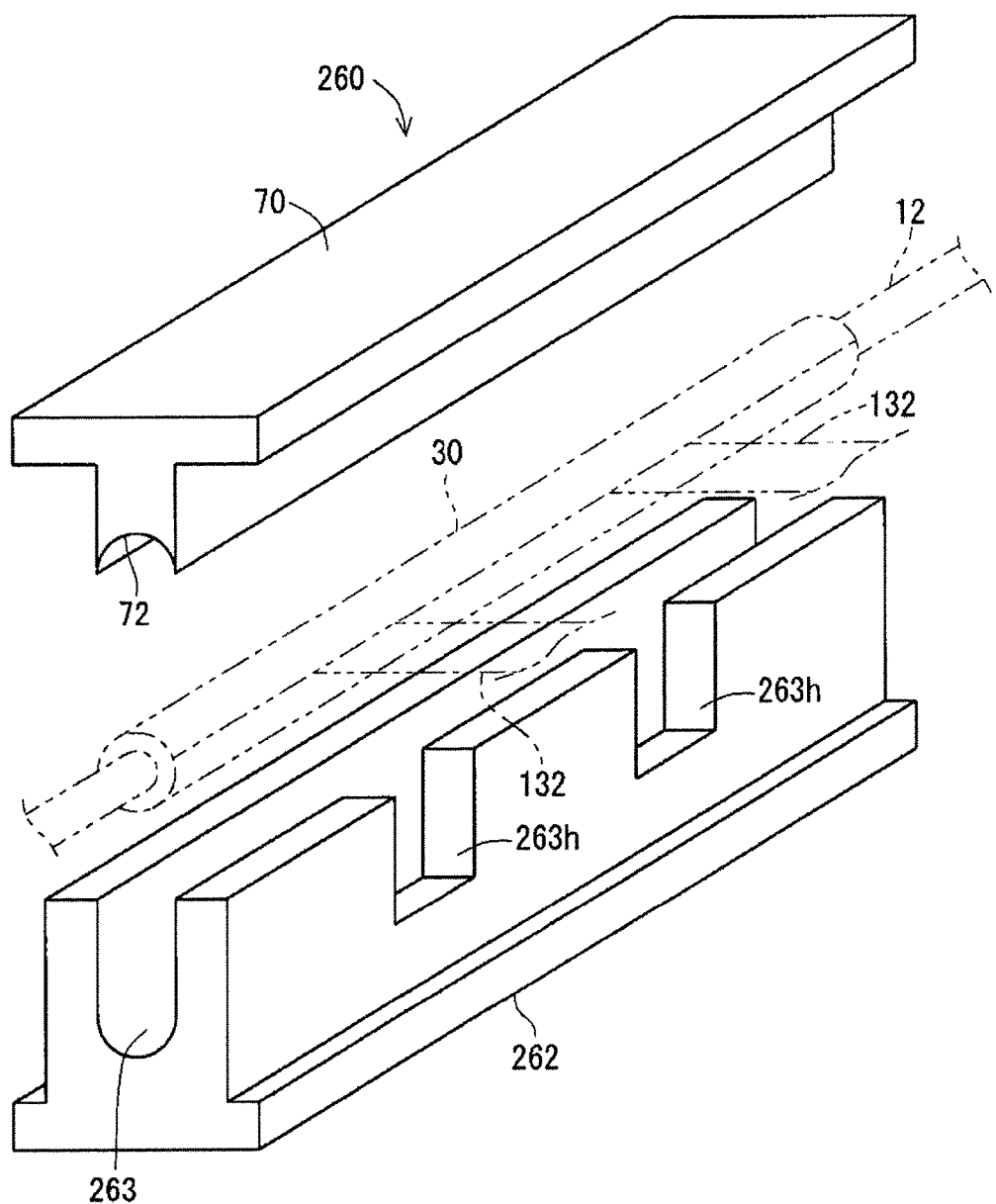
FIG. 15 A view illustrating a process of producing the wire harness according to the modified example.
Figure 16:
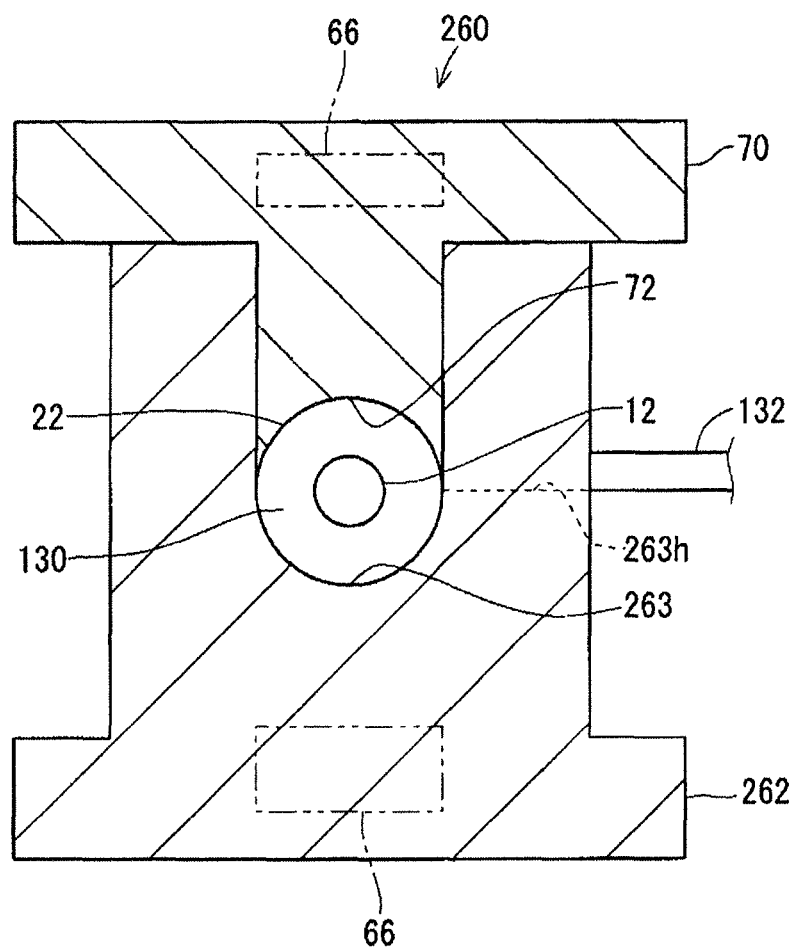
FIG. 16 A view illustrating a process of producing the wire harness according to the modified example.

In this state, the first nonwoven member 130 is hot-pressed using a hot-press mold 260, as shown in FIGS. 15 and 16. The hot-pressing mold 260 in this process preferably has a lower mold 262, which corresponds to the lower mold 62. The lower mold 262 has a lower mold surface 263, which corresponds to the lower mold surface 63, and a pair of grooves 263h in portions corresponding to the pair of second nonwoven members 132. The grooves 263h are each formed into a shape having the same width as the second nonwoven member 132 and reaching a bottom side portion of the lower mold surface 263.

Then, in a state where the second nonwoven members 132 are pulled out from the grooves 263h, the wrapped first nonwoven member 130 is placed in the lower surface mold 263 and is hot-pressed, similar to the embodiment above.

Figure 14:
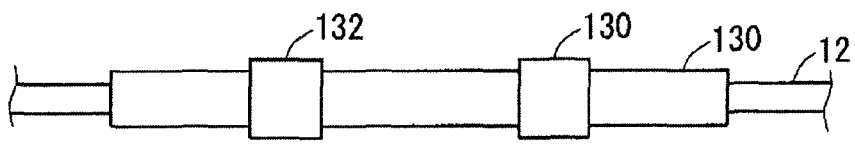
FIG. 14 A view illustrating a process of producing the wire harness according to the modified example.

Thereafter, with reference to FIG. 14, the second nonwoven members 132 are wrapped around an outer periphery of the hot-pressed first nonwoven member 130. Then, similar to the embodiment above, the portions where the second nonwoven members 132 are wrapped are hot-pressed using the hot-pressing mold 160, and thus a wire harness similar to that in the embodiment above is produced. In particular, according to the present modified example, one nonwoven sheet is used for production. This reduces the kind and number of components and facilitates production. Another advantage is that the portions where the second nonwoven members 132 are wrapped are readily aligned.

The detailed description above of the present invention is presented merely as an example in all aspects and should not limit the present invention. Innumerable modifications not presented are construed to be assumed without deviating from the scope of the present invention.

The invention claimed is:

1. A wire harness comprising:
   a wire harness main body including at least one wire; and
   a protection member comprising:
   an inner peripheral protection portion formed by hot-pressing a nonwoven member covering at least a portion of the wire harness main body; and
   an outer peripheral protection portion formed by hot-pressing a nonwoven member covering at least a portion of the inner peripheral protection portion in a longitudinal extending direction of the inner peripheral protection portion, wherein the outer peripheral protection portions are spaced apart from each other along the longitudinal extending direction of the inner peripheral protection portion, wherein the inner peripheral protection portion extends entirely through the outer peripheral protections portions in the longitudinal extending direction of the inner peripheral protection portion, and wherein the outer peripheral protection portions are softer than the inner peripheral protection portion.

2. The wire harness according to claim 1, wherein each of the outer peripheral protection portions is larger in size than a gap serving as a mounting location such that each of the outer peripheral protection portions is press-fittable within the gap.

3. The wire harness according to claim 1, wherein each of the outer peripheral protection portions has a circular shape in cross section.

4. A method of producing a wire harness having a protection member covering at least a portion of a wire harness main body including at least one wire, the method comprising:

wrapping a first nonwoven member around at least a portion of the wire harness main body;

hot-pressing the first nonwoven member to form an inner peripheral protection portion;

wrapping a second nonwoven member around a portion of the inner peripheral protection portion in a longitudinal extending direction of the inner peripheral protection portion;

hot-pressing the second nonwoven member to form outer peripheral protection portions; and providing the outer peripheral protection portions to be spaced apart from each other along the longitudinal extending direction of the inner peripheral protection portion, providing the inner peripheral protection portion so as to extend entirely through the outer peripheral protections portions in the longitudinal extending direction of the inner peripheral protection portion, and providing the outer peripheral protection portions to be softer than the inner peripheral protection portion.

* * * * *